3,264,285
NOVEL 19-NOR-TESTOSTERONE-17-HEMI-
ACETALS AND -HEMIACETAL ESTERS
Poul Borrevang, Copenhagen, Denmark, assignor to
Lovens Kemiske Fabrik ved A. Kongsted, Ballerup,
Denmark, a firm
No Drawing. Filed July 3, 1961, Ser. No. 121,334
Claims priority, application Great Britain, July 13, 1960,
24,462/60
13 Claims. (Cl. 260—239.5)

This invention relates to novel 19-nor-testosterone-17-hemiacetals and -hemiacetal esters having the general formula:

(I)
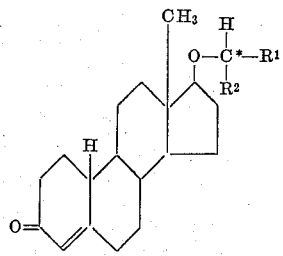

in which $R^1$ is a group selected from the class of unsubstituted aliphatic groups and aliphatic groups substituted by at least one halogen atom, at least one aromatic group, the phenoxy group and at least one heterocyclic group, and $R^2$ is a member of the class consisting of a hydroxy group and an ester group.

The carbon atom marked by an asterisk in Formula I is an asymmetric carbon atom, from which it appears that there may be the possibility of substances according to the formula existing in two stereoisomeric forms differing by $R^1$ and $R^2$ being interchanged.

In the case of several substances produced according to the present invention, the existence of the two forms stereoisometric with respect to the carbon atom marked has been realised and is some cases their properties have been found to differ to a not inconsiderable degree. In such cases, when both of the forms which are stereoisomeric in the sense mentioned above are described in the following, they will be designated as "the lower melting" and the "higher melting" form. The invention is concerned with the stereoisomers individually as well as with mixtures thereof as far as stereoisomery in this respect concerns.

In other cases, however, one of the two forms may be produced predominantly and the other form may be lost during the processes of purification so that for this reason only one form has been located. There may be other reasons, however, why in some particular case but one of the stereoisomeric forms has been located, among which may be mentioned that in some cases only one form may actually exist, f. inst. owing to steric hindrances in the molecule.

The 19-nor-testosterone-hemiacetals and -hemiacetal esters are capable of exerting anabolic and androgenic activities. In clinical therapy, however, it is particularly the anabolic activity which is interesting, and for such therapeutical purposes the said derivatives may f. inst. be administered in the form of injections of a suitable oil, in which the free hemiacetal or hemiacetal ester has been dissolved or dispersed, or in the form of injections of aqueous suspensions of the crystalline derivatives. For the latter purpose especially the hemiacetal esters are suitable as a therapeutical component, since they are more stable in the presence of water than the free hemiacetals themselves.

According to tests carried out in connection with the present invention it has now been found that when the 17-hydroxy-group of 19-nor-testosterone is converted into a hemiacetal group or a hemiacetal ester group, certain of the derivatives attained, if administered in one of the forms mentioned above, show a more protracted effect than the hitherto known derivatives of 19-nor-testosterone such as its phenylpropionic acid ester or other esters when similarly administered.

Moreover it has been found that the ratio between the anabolic and androgenic activity of the 19-nor-testosterone may be changed by converting this steroid into the derivatives forming the subject matter of the present invention. This change may be in a desirable direction with regard to particular therapeutical purposes.

As an illustrating example of the latter effect may be mentioned that the anabolic property of 19-nor-testosterone-chloral-hemiacetal acetate is equal to that of 19-nor-testosterone-phenylpropionate, while the androgenic property of the said hemiacetal ester amounts to only 60% of that of the reference substance. This appears from animal experiments in which the androgenic and anabolic potency of the said substances were evaluated by weighing the vesiculae seminalis+prostata and levator ani, respectively, from groups of dissected castrated male rats which had been treated with a single subcutaneous injection with an oily solution of the steroid compound in question 8 days before killing.

In view of this effect the 19-nor-testosterone-hemiacetal acetate may be used in the treatment of surgical patients in order to shorten the convalescence period.

On the other hand the protracted effect obtained when administering the lower melting form of 19-nor-testosterone-chloral-hemiacetal-furanate has been ascertained in a biological test in which a number of test animals, castrated male rats, had been divided into three groups and each animal of each group had received an injection of 3 mgs. of 19-nor-testosterone-chloral-hemiacetal-furanate dissolved in oil, 3 mgs. of the same substance in the form of a aqueous suspension of crystals and 3 mgs. of 19-nor-testosterone-phenylpropionate dissolved in oil, respectively.

10 animals from each group were killed 1, 2, 3, 4 and 8 weeks after injection and the average weight of levator ani collected from the dissected animals of the group was used for measuring the anabolic activity. The results obtained are given in the following table, from which the favourable protracted effect of 19-nor-testosterone-chloral-hemiacetal-furanate (lower melting form) will appear.

Table

| | Weight of levator ani (mg.) after— | | | |
|---|---|---|---|---|
| | 1 week | 2 weeks | 4 weeks | 8 weeks |
| 19-nor-testosteronephenylpropionate 3 mg. in oil | 27.7 | 35.5 | 19.7 | 18.1 |
| 19-nor-testosterone-chloral-hemiacetal, furanate (M.P. 121–122°) 3 mg. in oil | 26.9 | 43.9 | 49.9 | 31.5 |
| Same substance 3 mg. in aqueous suspension 10 particles | 29.3 | 40.2 | 29.2 | 25.4 |

The two steroeisomeric forms of the hemiacetals or hemiacetal esters forming the subject matter of the present invention have been found to exert equal biological activity, whereas their potency may differ to a certain degree.

A further object of the present invention is a method of producing the 19-nor-testosterone derivatives above defined. According to this method 19-nor-testosterone is reacted with an aliphatic aldehyde which may contain as substituents one or more halogen atoms, aromatic groups including a phenoxy group, or a heterocyclic group or with a reactive derivative of the aldehyde, after which one or both of the stereoisometric forms of the hemiacetal obtained a mixture of the stereoisomer is isolated and purified or, when esters are desired, the crude hemiacetal obtained by the aforenamed reaction is further reacted with an acylating agent containing the acyl group corresponding to the acid with which the said hemiacetal is to be esterified, after which one or both of the stereoisomeric forms of the hemiacetal ester is or are isolated and purified or the separated stereosiomeric forms of the free hemiacetal are esterified individually.

The reaction can be carried out in dilute solution, f. inst. by dissolving the 19-nor-testosterone in a suitable solvent and adding the aldehyde, or the aldehyde may itself be used as a solvent, after which the mixture is left standing at a suitable temperature for the period of time required to complete the desired reaction. If the temperature is about 20° C., the reaction may be completed within a few hours or by standing overnight.

As suitable solvents may be mentioned, by way of example, benzene, toluene, ether, dioxane, pyridine or similar solvents.

As is well known aldehydes and alcohols react under suitable conditions to produce acetals or hemiacetals in high yield and many aldehydes can be used in the method of the present invention. It is further known that by reaction with water some aldehydes are converted into hydrates, which reaction is analogous to the formation of acetals or hemiacetals so that aldehydes capable of forming hydrates are usually capable of readily forming acetals or hemiacetals.

Preferred aldehydes used as raw material in the method are chloral, bromal, fluoral and other halogenated aliphatic aldehydes as for inst. butylchloral (2,2,3-dichloral-butanal) and aliphatic aldehydes substituted by aromatic or heterocyclic groups, as f. inst. phenoxyaldehyde and pyridylaldehyde.

The aldehyde may be added in amounts equivalent to that of 19-nor-testosterone or in excess. Furthermore the aldehyde can be used in the form of its reactive derivatives for which purpose particularly the hydrates are suitable. Thus, for inst. chloral hydrate, bromal hydrate is floural hydrate may be substituted for chloral, bromal or fluoral, respectively.

When performing the reaction as described hereinbefore the 19-nor-testosterone will usually dissolve in the reaction mixture after shaking for a while. During the reaction the hemiacetal may precipitate or it can be precipitated after conclusion of the reaction by adding to the mixture a component capable of reducing the solubility of the reaction product.

In many reactions, however, only one of the two stereoisomeric forms is produced in high yield, so that the minor amounts of the other form get lost in the reaction mixture, from which the crude hemiacetal has been precipitated.

The crude products thus precipitated may be isolated, f. inst. by filtration, and purified by recrystallization from a suitable solvent or mixture of solvents, the process of purification being repeated until the substance obtained is free from the undesired stereoisomeric form.

By evaporation of the mother liquor and recrystallization of the residue thus obtained the other stereoisomeric form may in some cases be obtained in pure form.

In some cases the purification of the derivatives or the process of separation of the two stereoisomeric forms, is facilitated by esterification of the free hydroxy groups contained in the hemiacetal group before recrystallization, the esters crystallizing in many cases more readily than the corresponding free hemiacetals.

Some esters possess properties useful for particular therapeutical purposes, the utilization of the physiological activity of the steroid compound depending in many cases on the form of administration used.

Thus by esterification of the free hydroxy group of the hemiacetal group slightly water soluble esters can be formed, which have particularly favourable properties with regard to protracted effect, as mentioned in the foregoing. By esterification of the free hydroxy group of the hemiacetal group with f. inst. amino-acids or one of the carboxyl groups of succinic acid, esters are produced the salts of which with acids or bases, respectively, are readily soluble in water.

The acid groups preferred as constituents of hemiacetal esters of the invention are, f. inst., the formyl-, acetyl-, propionyl-, butyryl-, isobutyryl-, cyclopentyl-propionyl-, phenylpropionyl, enanthyl-, furoyl-, glycyl-, succinyl-, and glutaryl groups.

The invention will now be illustrated by the following examples.

*Example 1.—19-nor-testosterone-17-chloral-hemiacetal (higher melting form)*

2.7 g. of 19-nor-testosterone were added to a solution of 1.7 g. of anhydrous chloral in 10 ml. of dry benzene. After a couple of minutes a clear solution was obtained, and after about 10 minutes the solution solidified completely. After standing for about further 10 minutes, the solid substance was filtered off and washed with a little benzene and petrolether. After drying at room temperature, 3.6 g. of the desired substance were obtained. By recrystallization from ethyl acetate the substance had a melting point of 184–186°. The ultraviolet spectrum showed a maximum of 240 m$\mu$ (in ethanol) $\epsilon = 17,400$.

Calculated: C, 56.95; H, 6.45; Cl, 25.22. Found: C, 57.19; H, 6.52; Cl, 25.22.

*Example 2.—19-nor-testosterone-17-chloral-hemiacetal (higher melting form)*

6.5 g. of 19-nor-testosterone were dissolved in 26 ml. of anhydrous chloral, and the mixture was shaken. After two minutes a substance began to precipitate, and after shaking for further 15 minutes the substance thus precipitated was isolated by filtration. The filter-cake was washed with benzene and thereafter dried. The product thus obtained was identical with that prepared in Example 1.

*Example 3.—19-nor-testosterone-17-chloral-hemiacetal acetate (higher melting form)*

2.0 g. of 19-nor-testosterone-17-chloral-hemiacetal were dissolved in a mixture of 6 ml. of dry pyridine and 6 ml. of acetic anhydride. After standing for 17 hours at room temperature, the solution was evaporated in vacuo on a steam-bath to a syrupy consistency. The residue was dissolved by heating in 96% ethanol, and after standing in an ice-box the crystals precipitated were filtered off, washed with a little of 96% ethanol and dried at room temperature. Thereby 1.1 g. of the desired substance was obtained. By recrystallization from 96% ethanol the substance had a melting-point of 150–151°. The ultra-violet spectrum showed a maximum at 239 m$\mu$ (in ethanol), $\epsilon = 17,400$.

Calculated: C, 56.97; H, 6.30; Cl, 22.93. Found: C, 56.96; H, 6.56; Cl, 22.68.

By substituting propionic anhydride for acetic anhydride, the 19-nor-testosterone-17-chloral-hemiacetal propionate was prepared following the method described above, the propionate obtained having a melting-point of 102–104° and a maximum at 239 mμ in the ultra-violet spectrum ($\epsilon=16,800$). It is not known whether this compound is the higher melting or the lower melting stereoisomer.

*Example 4.—19-nor-testosterone-chloral-hemiacetal isobutyrate*

6.3 g. of 19-nor-testosterone-chloral-hemiacetal prepared as described in Example 1 were dissolved in 15 ml. of pyridine. The solution was cooled to a temperature of −20° C., after which, in a nitrogen atmosphere, 3 g. of isobutyric acid chloride were added dropwise. The reaction mixture was stirred for 15 minutes at −20° C. and thereafter placed in a refrigerator having a temperature of +2° C., in which it was left standing for 2 days. Then to the reaction mixture was added a mixture of 100 ml. of ether and 100 ml. of ethyl acetate, and the organic phase was extracted twice with 50 ml. of 2 N sulphuric acid, once with water, twice with 50 ml. of 2 N sodium hydroxide and finally with water. After drying the organic phase over $Na_2SO_4$, it was evaporated in vacuo to dryness, and the oily residue was recrystallized from 80% methanol. The crystalline substance contained one mole of crystal methanol and had a melting point of 85–87°. The ultra-violet spectrum showed a maximum at 239 mμ ($\epsilon=16,900$).

Calculated: C, 57.31; H, 7.12; Cl, 20.30. Found: C, 57.39; H, 7.03; Cl, 21.19.

*Example 5.—19-nor-testosterone-chloral-hemiacetal furanate (lower melting form)*

Following the procedure described in Example 4, but substituting furoyl chloride for isobutyric acid chloride, a furanate was obtained having a melting point of 121–122° C. after recrystallization from 96% ethanol. The ultra-violet spectrum showed a maximum at 246 mμ ($\epsilon=26800$).

Calculated: C, 58.20; H, 5.67; Cl, 20.62. Found: C, 57.98; H, 5.71; Cl, 20.54.

*Example 6.—19-nor-testosterone-chloral-hemiacetal formate*

3 g. of 19-nor-testosterone-chloral-hemiacetal prepared as described in Example 1 were dissolved in 15 ml. of pyridine, after which a mixture of 7.5 ml. of acetic anhydride and 2.9 ml. of formic acid which had before been left standing for 24 hours was added. The reaction mixture was left standing for 4½ hours and thereafter evaporated to dryness. The residue was recrystallized from ether and the substance thus obtained was further recrystallized from 96% ethanol. The desired substance thus obtained from 96% ethanol, had a melting point of 196–197°, and the ultra-violet spectrum showed a maximum at 239 mμ ($\epsilon=17,300$).

Calculated: C, 56.07; H, 6.05; Cl, 23.65. Found: C, 56.04; H, 6.18; Cl, 23.61.

*Example 7.—19-nor-testosterone-17-phenoxyacetalaldehyde-hemiacetal*

2.7 g. of 19-nor-testosterone were added to a solution of 1.6 g. of phenoxyacetaldehyde in 10 ml. of dry benzene, whereby a clear solution immediately was formed. After standing for 3 hours at room temperature, a little of ether was added and the solution was poured into petrolether. Thereby an oily substance separated. After standing for a while, the supernatant phase was decanted from the oily substance, which crystallized by addition of a small quantity of ether. The crystals were filtered off, washed with a little of petrolether, and after drying in the air at room temperature, 0.5 g. of the desired substance was obtained having a melting point of 124–127°. The ultra-violet spectrum showed maxima at 224 mμ and 240 mμ (in ethanol), ($\epsilon=16,100$) and ($\epsilon=18,300$).

Calculated: C, 76.06; H, 8.35. Found: C, 76.11; H, 8.39.

Following the procedure described in Example 6 for the preparation of 19-nor-testosterone-chloral-hemiacetal formate, but substituting 19-nor-testosterone-phenoxyacetaldehyde-hemiacetal for 19-nor-testosterone-chloral-hemiacetal, the formate was produced with a melting point of 173–175° C.

Calculated: C, 73.94; H, 7.82. Found: C, 73.91; H, 7.96.

*Example 8.—19-nor-testosterone-17-(pyridine-4-aldehyde)-hemiacetal*

2.0 g. of 19-nor-testosterone were dissolved at about 50° C. in 3.5 ml. of pyridine-4-aldehyde. After standing overnight, the crystals precipitated were filtered off and washed with a little ether. After drying in the air at room temperature, 1.1 g. of the desired substance was obtained. By recrystallization from acetone the substance had a melting-point of 135–138°. The ultra-violet spectrum showed a maximum at 240 mμ (in ethanol) ($\epsilon=19,000$).

Calculated: C, 75.56; H, 8.19; N, 3.67. Found: C, 75.55; H, 8.27; N, 3.68.

*Example 9.—19-nor-testosterone-17-butylchloral-hemiacetal*

2.7 g. of 19-nor-testosterone were added to a solution of 2.0 g. of butyl chloral ($\alpha,\alpha,\beta$-trichlorobutyraldehyde) in 10 ml. of dry benzene, whereby a clear solution immediately was obtained. After standing for 2½ hours at room temperature, 30 ml. of ether were added, and the solution was poured into petrolether. After standing for a while the substance crystallized, was filtered off and washed with a small quantity of petrolether. After drying in the air at room temperature, 1.6 g. of the desired substance were obtained. By recrystallization from ethyl acetate, a melting-point of 154–156° was obtained. The ultra-violet spectrum showed a maximum at 240 mμ (in ethanol) $\epsilon=17,400$.

Calculated: C, 58.74; H, 6.96; Cl, 23.64. Found: C, 58.56; H, 7.09; Cl, 23.71.

Following the procedure described in Example 3, 19-nor-testosterone-butylchloral-hemiacetal acetate was prepared having a melting point of 133–134° and a maximum in the ultra-violet spectrum at 240 mμ ($\epsilon=17,200$).

Calculated: C, 58.60; H, 6.76; Cl, 21.63. Found: C, 58.69; H, 6.88; Cl, 21.48.

*Example 10.—19-nor-testosterone-chloral-hemiacetal (lower melting form)*

6.5 g. of 19-nor-testosterone were dissolved in 10 ml. of pyridine, after which 10 ml. of anhydrous chloral were added. The reaction mixture was stirred for an hour, 80 ml. of water were added and the stirring was continued for further half-an-hour. The water-phase was decanted from the oily substance which had precipitated, and the latter substance was recrystallized from 15 ml. of acetone. The crystals obtained were filtered off and the filter-cake washed with a mixture of acetone and petrolether (1:1) and dried. The desired compound obtained had a melting point of 169–172° and is an isomer of that prepared in Example 1.

*Example 11.—19-nor-testosterone-chloral-hemiacetal acetate (lower melting form)*

The substance prepared in Example 10 was esterified following the procedure described in Example 3, whereby the desired substance was obtained which after recrystallization from ethyl acetate had a M.P. of 132–135° and a maximum in the ultra-violet spectrum at 240 mμ ($\epsilon=16,600$). $[\alpha_D^{20}]=+27.3°$ in $CHCl_3$.

Calculated: C, 56.96; H, 6.30; Cl 22.95. Found: C, 56.88; H, 6.46; Cl, 22.78. This compound is an isomer of that described in Example 3.

*Example 12.—19-nor-testosterone-chloral-hemiacetal furanate (higher melting form)*

The substance prepared as described in Example 10 was esterified as described in Example 5, thereby yielding the desired furanate having a melting-point of 229–233° and a maximum in the ultra-violet spectrum at 245 mμ ($\epsilon$=26,400).

Calculated: C, 58.20; H, 5.67; Cl, 20.62. Found: C, 58.16; H, 5.72; Cl, 20.54. The substance thus obtained is an isomer of that described in Example 5.

By evaporation of the mother-liquors obtained in the said Example 5 to dryness and recrystallization of the residue from ether, the higher melting form of the 19-nor-testosterone-chloral-hemiacetal furanate may also be obtained having a melting-point of 221–226°, which after recrystallization of the substance from 99% ethanol rose to 229–233°.

*Example 13.—19-nor-testosterone-bromal-hemiacetal*

In nitrogen atmosphere, 2.7 g. of 19-nor-testosterone were mixed with 5 ml. of dry benzene and 3.2 g. of bromal. The steroid compound dissolved immediately, but after 5 minutes the reaction mixture became partly solid, owing to the precipitation of the hemiacetal. The substance precipitated was filtered off and the filter-cake washed with a little amount of ether. After drying and recrystallization of the substance from acetone, the desired hemiacetal was obtained with a melting-point of 90–92°.

Calculated: C, 43.26; H, 4.90; Br, 43.19. Found: C, 43.03; H, 5.08; Br, 42.91.

What is claimed is:

1. A compound selected from the group consisting of 19-nor-testosterone-17-bromal - hemiacetal and esters thereof with an acid group selected from the group consisting of formyl, acetyl, propionyl, butyryl, isobutyryl, cyclopentylpropionyl, phenyl propionyl, enanthyl, furoyl-, glycyl, succinyl, and glutaryl groups.

2. A compound selected from the group consisting of 19 - nor - testosterone - 17 - phenoxyacetaldehyde-hemiacetal and esters thereof with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups.

3. 19 - nor-testosterone-17-phenoxyacetaldehyde-hemiacetal formate.

4. A compound selected from the group consisting of 19-nor-testosterone-17-butylchloral-hemiacetal and esters thereof with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups.

5. 19 - nor-estosterone-17-butylchloral-hemiacetal acetate.

6. A compound selected from the group consisting of 19 - nor-testosterone-17-(pyridine-4-aldehyde)-hemiacetal and esters thereof with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups.

7. The high melting stereoisomeric form of 19-nor-testosterone-17-chloral-hemiacetal furanate of M.P. 229–233° C.

8. The low melting stereoisomeric form of 19-nor-testosterone-17-chloral-hemiacetal furanate of M.P. 121–122° C.

9. A method of producing the novel 18-nor-testosterone-17-hemiacetals and -hemiacetal esters with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups, having the general structural formula

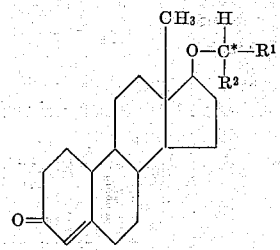

in which $R^1$ is an aliphatic radical containing not more than 3 carbon atoms which is substituted with members of the class consisting of halogens and aromatic groups and phenoxy groups, and $R^2$ is a member of the class consisting of a hydroxy group and ester groups, the asterisk in the formula indicating that the carbon atom of the hemiacetal group thus marked is an asymmerically substitued carbon atom, according to which the 19-nor-testosterone is reacted with an aliphatic aldehyde selected from the group consisting of aldehydes having not more than four carbon atoms and said aldehydes having as substituents members of the class consisting of halogens, aromatic groups, including phenoxy groups, a hydroxy group and ester groups, with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups whereafter the hemiacetal formed is recovered.

10. A method according to claim 9, in which the aldehyde used is added in the form of a reactive derivative of the said aldehyde.

11. A method according to claim 9, in which two stereoisomeric forms of the hemiacetal are obtained, separated and purified.

12. A method according to claim 9 in which the hemiacetal in two isomeric forms is obtained and esterified, whereafter the two stereoisomeric forms of the ester are separated.

13. A compound selected from the group consisting of novel 19-nor-testosterone-17-hemiacetals and -hemiacetal esters with an acid group selected from the group consisting of formyl, acetyl, propionyl, butyryl, isobutyryl, cyclopentyl-propionyl, phenyl propionyl, enanthyl, furoyl-, glycyl, succinyl, and glutaryl groups, having the general structural formula

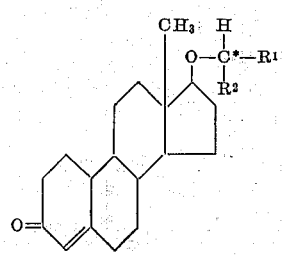

in which $R^1$ is pyridine, and $R^2$ is a member of the class consisting of a hydroxy group and ester groups, the asterisk in the formula indicating that the carbon atom of the hemiacetal group thus marked is an asymmetrically substituted carbon atom.

References Cited by the Examiner

UNITED STATES PATENTS 2,933,514   4/1960   Borrevang _____ 260—397.4

OTHER REFERENCES

Fieser and Fieser, Steroids, (1959), Reinhold Publishing Corp., New York, N.Y., pp. 692–698.

LEWIS GOTTS, *Primary Examiner.*

MORRIS LIEBMAN, IRVING MARCUS, *Examiners.*

HENRY A. FRENCH, *Assistant Examiner.*